(12) United States Patent
Evatt

(10) Patent No.: US 10,342,322 B2
(45) Date of Patent: Jul. 9, 2019

(54) MULTIPURPOSE BAG AND METHOD OF USE THEREOF

(71) Applicant: Jason B. Evatt, Dayton, OH (US)

(72) Inventor: Jason B. Evatt, Dayton, OH (US)

( * ) Notice: Subject to any disclaimer, the term of this patent is extended or adjusted under 35 U.S.C. 154(b) by 127 days.

(21) Appl. No.: 15/489,258

(22) Filed: Apr. 17, 2017

(65) Prior Publication Data

US 2017/0295914 A1  Oct. 19, 2017

Related U.S. Application Data

(60) Provisional application No. 62/324,668, filed on Apr. 19, 2016.

(51) Int. Cl.

| | | |
|---|---|---|
| *A45F 4/06* | (2006.01) | |
| *C02F 1/00* | (2006.01) | |
| *A47C 27/08* | (2006.01) | |
| *B65D 33/01* | (2006.01) | |
| *A45F 3/20* | (2006.01) | |
| *B01D 35/157* | (2006.01) | |
| *B05B 1/18* | (2006.01) | |
| *A45F 3/16* | (2006.01) | |

(52) U.S. Cl.
CPC .................. *A45F 4/06* (2013.01); *A45F 3/20* (2013.01); *A47C 27/081* (2013.01); *B01D 35/1573* (2013.01); *B65D 33/01* (2013.01); *C02F 1/002* (2013.01); *A45F 2003/163* (2013.01); *B05B 1/18* (2013.01); *C02F 2201/005* (2013.01)

(58) Field of Classification Search
CPC ........ A45F 4/06; A45F 3/20; A45F 2003/163; C02F 1/002; C02F 2201/005; A47C 27/08; B65D 33/01; B01D 35/1573; B05B 1/18

See application file for complete search history.

(56) References Cited

U.S. PATENT DOCUMENTS

| | | | |
|---|---|---|---|
| 2008/0172792 A1* | 7/2008 | Dreessen ............. | A47G 9/1045 5/636 |
| 2010/0044396 A1* | 2/2010 | Skillern ................ | A45C 11/20 222/209 |
| 2014/0326558 A1* | 11/2014 | Marti ..................... | A45C 9/00 190/2 |
| 2018/0201523 A1* | 7/2018 | Vestergaard Frandsen ................ | B01D 63/02 |

FOREIGN PATENT DOCUMENTS

CA          2913766 A1 *  3/2016  ............. B01D 63/02

* cited by examiner

*Primary Examiner* — David C Mellon
*Assistant Examiner* — Liam Royce
(74) *Attorney, Agent, or Firm* — R. William Graham

(57) ABSTRACT

A waterproof dry bag with water potable material that utilizes a sealable connection to enable the user the option of collecting water and dispersing it through a bottom of the bag and which can be filtered with a water filter device. The bag can also be used to pump an air mattress.

3 Claims, 4 Drawing Sheets

MULTIPURPOSE BAG AND METHOD OF USE THEREOF

CROSS-REFERENCE TO RELATED APPLICATION

This application claims the benefit of U.S. Provisional Application No. 62/324,668, filed Apr. 19, 2016.

FIELD OF INVENTION

The present invention relates to the field of camping and/or survival equipment. More particularly, the invention relates to a multipurpose bag and method of using the same for camping or survival.

BACKGROUND OF THE INVENTION

There exist various types of camping and survival equipment. For example, there exist sleeping bags, air mattresses, water containers and water filtration systems. Some these components are contained in stuff sacks otherwise referred to as "dry bags" for gear which are made of simple lightweight waterproof material. These bags are made to hold/protect item(s) an individual wants to carry and maintain dry or away from the inclement elements.

While such equipment is helpful, there is a need to improve on such equipment. Accordingly, the instant invention improves the versatility of such prior devices.

SUMMARY OF INVENTION

It is an object to improve camping and/or survival equipment.

It is another object to improve containment bags used in camping and or survival equipment.

Another object is to provide an improved multipurpose bag for camping and or survival equipment.

Still another object is to provide a method of using a multipurpose bag for camping and or survival equipment.

An object is to provide a device and method of providing potable water.

Yet another object is to provide a device and method of inflating an air mattress with a multipurpose bag.

Accordingly, one aspect of the invention is directed to a multipurpose bag, which includes a bag made of non-breathable water proof material which is water containable safe for human consumption. The bag includes a top having an opening of a size to receive at least one complementary accessory therein, a side wall having a first end connected to said top having a length to accommodate the accessory therein, and a bottom connected to a second end of said side wall. A first valve connection component sealably connects to the bag to permit fluid communication upon actuation thereof and a second valve connection component connects to the first valve connection component and having a first end of a conduit connected thereto.

A third valve connection component connects to a second end of the conduit. The complementary accessory can include an inflatable mattress having fourth valve connection component for connection to said third valve connection component. Optionally, the complementary accessory can include a water filter device having fourth valve connection component for connection to the third valve connection component.

Preferably, the valve connection components are quick connect valve components. The bag is a dry bag made of water potable thermoplastic polyurethanes (TPU).

Another aspect of the invention is directed to a method of inflating an air mattress, which includes the steps of employing a bag made of non-breathable material, the bag including a top having an opening of a size to receive an inflatable mattress therein, a side wall having a first end connected to the top having a length to accommodate the inflatable mattress therein, a bottom connected to a second end of the side wall, a first valve connection component sealably connected to the bag to permit fluid communication upon actuation thereof, employing a second valve connection component and connecting to the first valve connection component and having a first end of a conduit connected to the second valve connection component and connecting a second end of the conduit to a mattress valve of the inflatable mattress, trapping air inside said bag; and applying pressure to the bag to cause trapped air to move into the mattress through the mattress valve causing inflation thereof.

Another aspect of the invention is a method of providing potable water includes the steps of providing a bag made of water proof material which is water containable safe for human consumption, the bag including a top having an opening to readily receive water therethrough, a side wall having a first end connected to the top, a bottom connected to a second end of the side wall, a first valve connection component sealably connected to the bag to permit fluid communication upon actuation thereof and connecting a second valve connection component to the first valve connection component and having a first end of a conduit connected to the second valve connection component, connecting a second end of the conduit to a water filtration device having an openable filter valve thereon, placing water into said bag; and opening the filter valve where water passes therethrough in a manner to provide potable water.

DETAILED DESCRIPTION OF THE INVENTION

Figure 1:
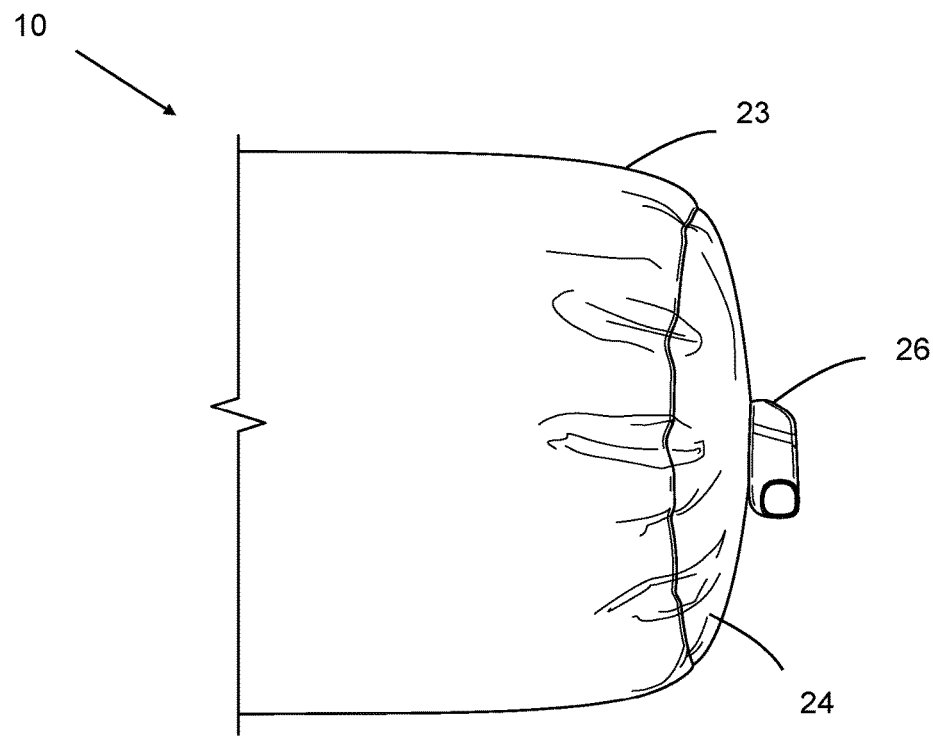
FIG. 1 shows a portion of a multipurpose bag of the invention.
Figure 2:
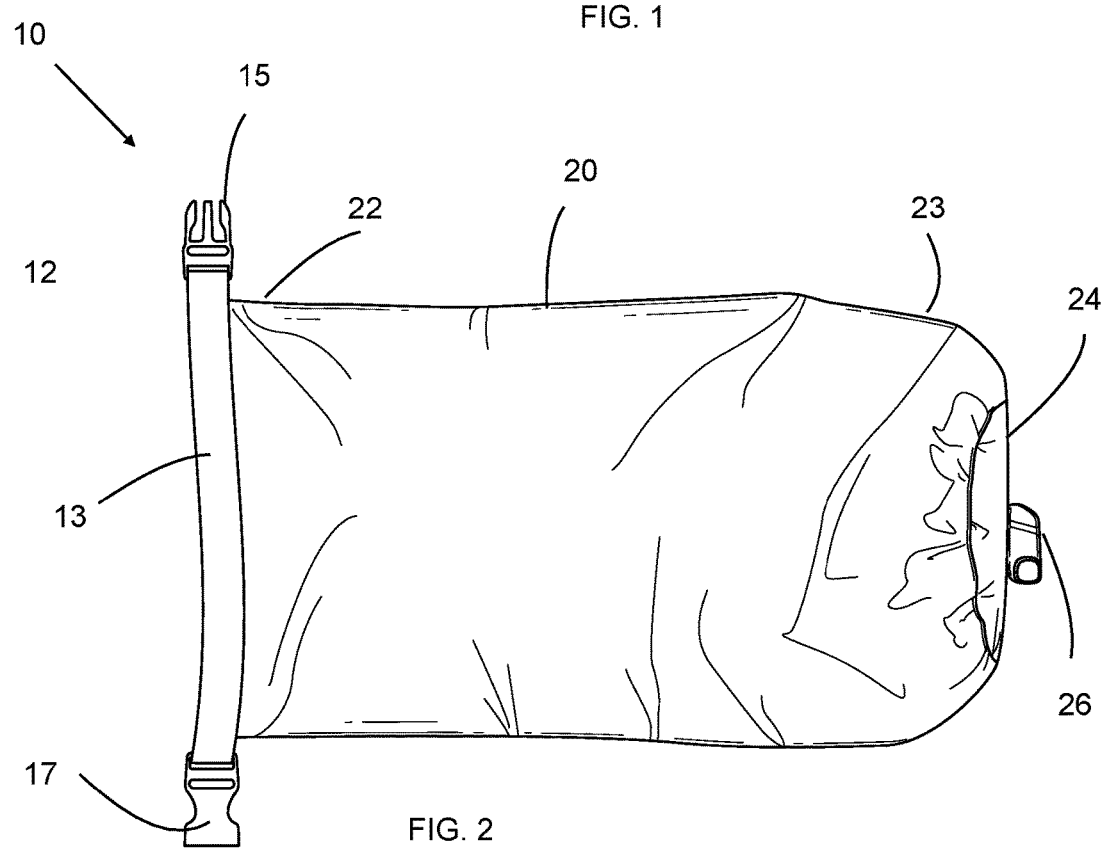
FIG. 2 shows a multipurpose bag of the invention.
Figure 3:
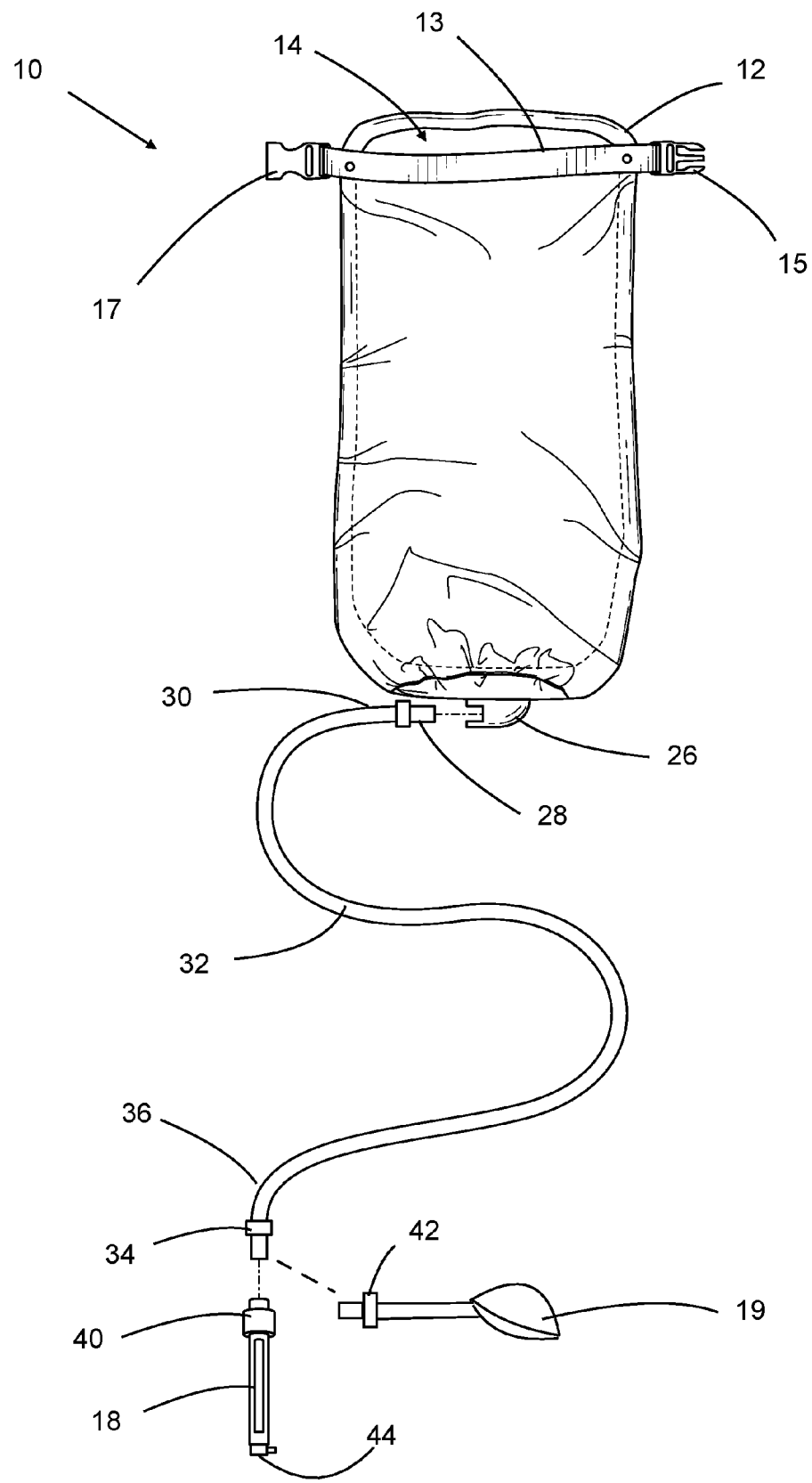
FIG. 3 shows a multipurpose bag of the invention with an open top for water usage accessories.
Figure 4:
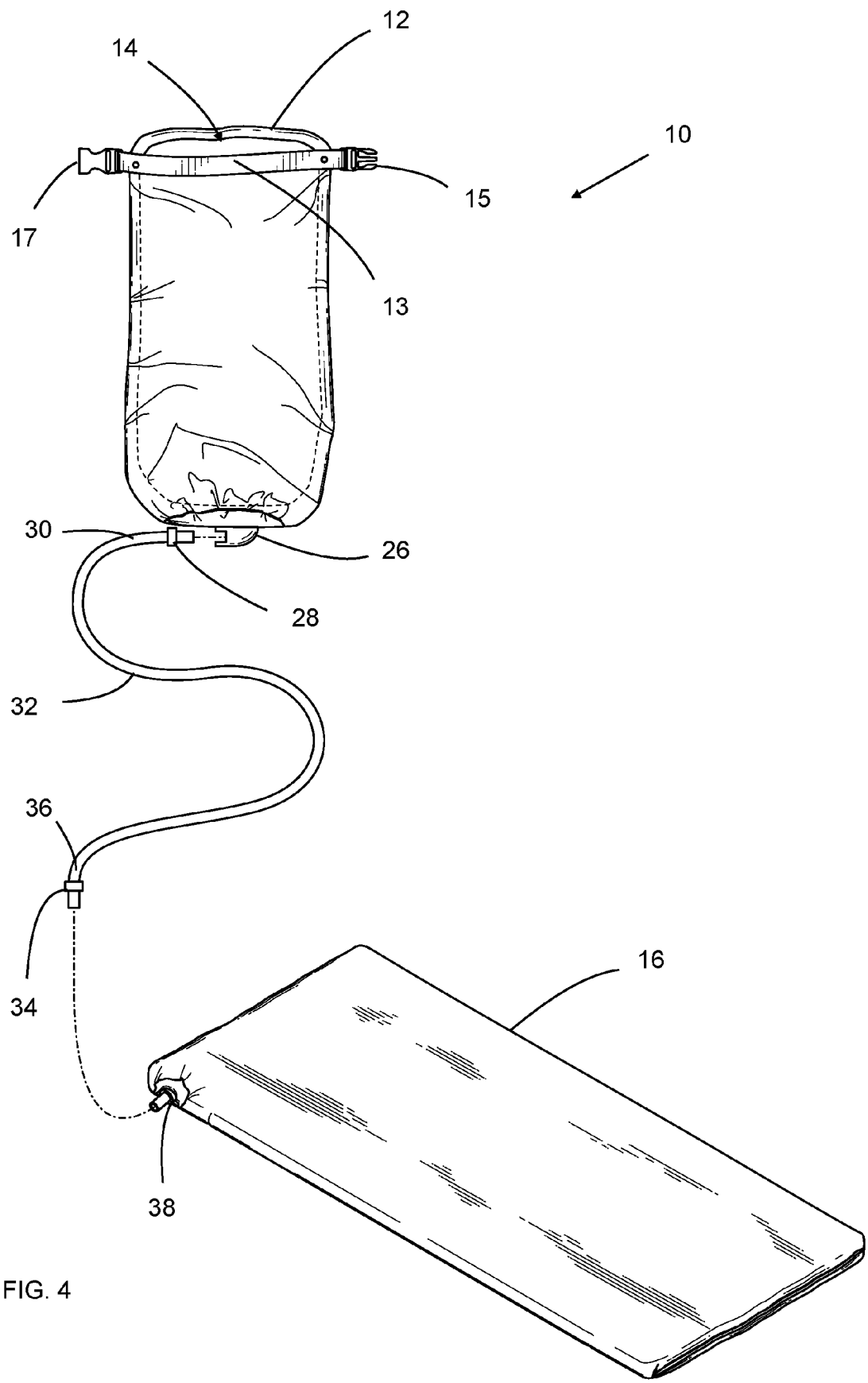
FIG. 4 shows a multipurpose bag of the invention with an open top for an air inflatable accessory.
Figure 5:
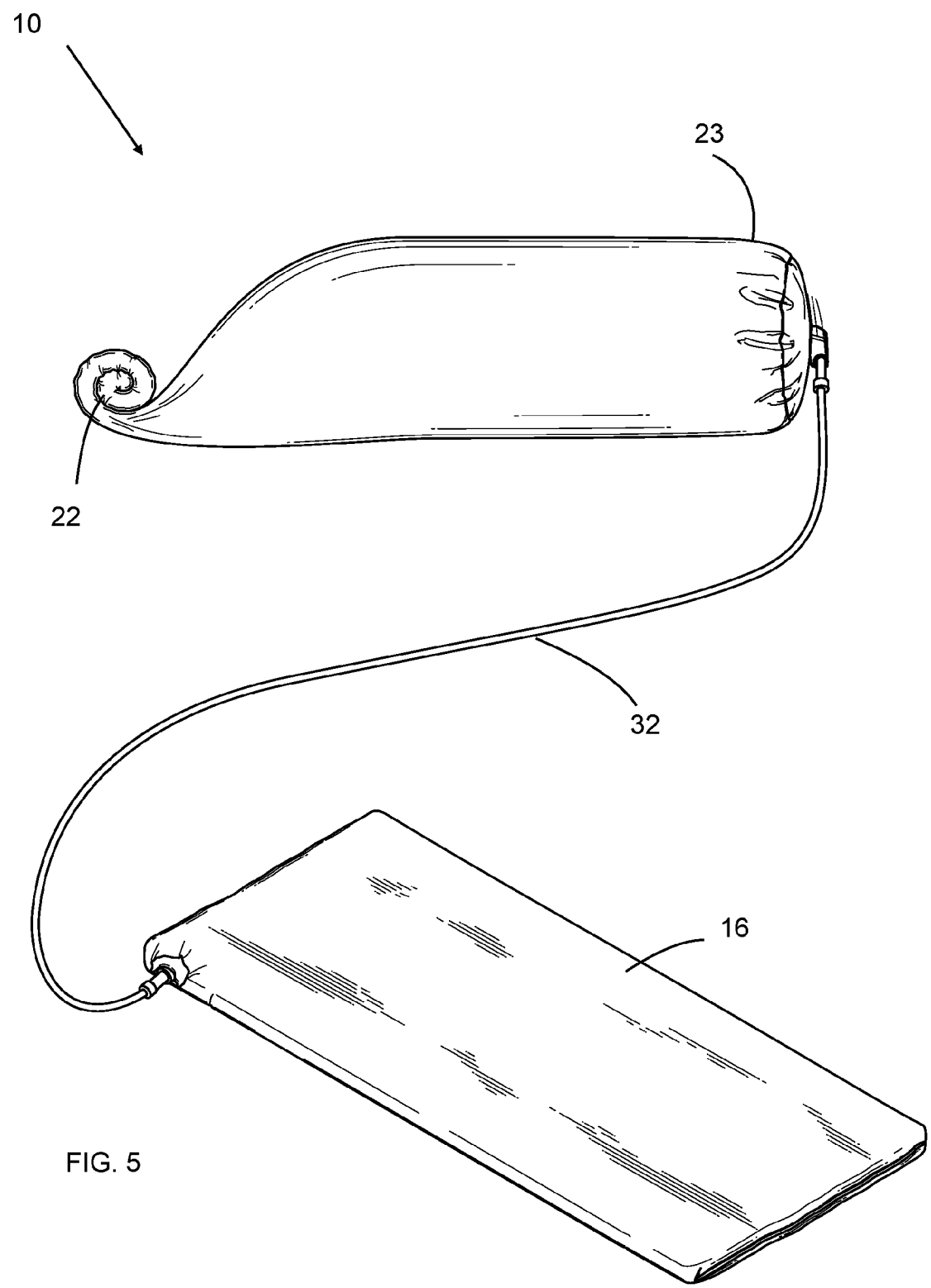
FIG. 5 illustrates a multipurpose bag of the invention inflating an air inflatable accessory.

Referring now to the drawings, the multipurpose bag and method of use thereof is generally referred to by the numeral 10. The multipurpose bag 10 is made of water potable, non-breathable waterproof material such as water potable thermoplastic polyurethane (TPU) and can serve as a dry bag or water containable safe for human consumption. The bag 10 includes a top 12 having an opening 14 of a size to receive at least one complementary accessory therein such as an inflatable mattress 16 or water filtration device 18. A side wall 20 of the bag 10 has a first end 22 connected to the top 12 and preferably has a length to suitably accommodate accessories 16 and 18 therein. A bottom 24 of the bag 10 is connected to a second end 23 of the side wall 20.

A valve connection component 26 sealably connects to the bag 10, here shown connected to bottom 24, though it could be located on another suitable place on the bag 10, such as on a lower part of the side wall 20, to permit fluid communication upon actuation thereof. A valve connection component 28 connects to the valve connection component 26 and has a first end 30 of a conduit 32 connected thereto.

A valve connection component 34 connects to a second end 36 of the conduit 32. The complementary accessory 16 can include an inflatable mattress having a valve connection component 38 for connection to the third valve connection component 34. The complementary accessory 18 can include a water filter device having valve connection component 40 for connection to the valve connection component 34. Preferably, the valve connection components 26, 28, 34, 38, 40 and 42 are quick connect valve components.

Another aspect of the invention is directed to a method of inflating air mattress 16, which includes the steps of employing bag 10 as described above made of non-breathable material waterproof material, the bag 10 including top 12 having an opening 14 of a size to readily receive inflatable mattress 16 (in a rolled and deflated mode) therein, side wall 20 has having a length to accommodate the inflatable mattress 16 therein, bottom 24, a valve connection component 26 sealably connects to the bag 10, connecting valve connection component 28 to the valve connection component 26 and having a first end 30 of a conduit 32 connected to valve connection component 28 and connecting a second end 36 of the conduit 32 to a mattress valve 38 (which can be quick connect) of the inflatable mattress 16, trapping air inside the bag 10 (e.g., opening the bag 10 and then closing the top 12); and applying pressure to the bag 10 (e.g., rolling up the bag 10 from the top 12 toward the bottom 24) to cause trapped air to move into the mattress 16 through the mattress valve 38 causing inflation thereof.

Another aspect of the invention is a method of providing potable water includes the steps of providing bag 10 as indicated is made of water proof material which is water potable safe for human consumption, the bag 10 including a top 12, side wall 20, bottom 24 and a valve connection component 26 as described above, connecting a valve connection component 28 to the valve connection component 26 and having a first end 30 of a conduit 32 connected to the second valve connection component 28, connecting a second end 34 of the conduit 32 to a water filtration device 18 having an openable filter valve 44 thereon, placing water through the top 12 into the bag 10; and opening the filter valve 44 where water passes therethrough in a manner to provide potable water.

Prior dry bags are not made of material approved for potable water. It is contemplated that other variations, modifications and improvements of the invention are contemplated and are intended to be covered by the claims appended hereto. For example, a food-grade waterproof stuff sack (dry bag) with a quick connect valve.

The invention provides a user to carry his/her gear and inclusive of mattress and water filter. Thus, the bag 10 can be used for different purposes such as storage, collecting water or blowing up an air pad. It is envisioned the bottom of bag 10 can be configured for items or water storage or used as a pump or attach other devices that can connect to the bag 10 such as a shower head 19 with valve connection component 42.

The bag of the instant invention negates the user from having to carrying additional equipment, such as a container for filtering water or a billow type device to blow up an air pad (mattress). As previously stated, most stuff sacks (dry bags) for outdoor gear are made of simple waterproof material that is intended to keep the contents dry. The invention herein provides the user with multiple uses without the need of additional equipment (saving space/weight/costs).

The claimed invention differs from what currently exists. Waterproof bags are common in the outdoor industry; however, the instant invention provides a water potable stuff sack (dry bag) with fluid connections that can be used to dispense water or air once the gear has been removed. Standard stuff sacks (dry bags) serves only one purpose; to keep the items dry until the user gets to the intended location/activity. A multi-purpose water potable waterproof bag 10 negates the need the user from carrying additional equipment required to collect and drain water, filter water and/or collect air and disperse it for purposes of blowing up an air mattress.

The bag 10 is formed with waterproof, water potable material to prevent chemicals from leeching into the water. Once the size of the bag is determined, the materials are cut to size and either sewn together utilizing waterproof seam tape or welded/bonded together. A suitable connection valve or port can be formed with a flange for sealable connection and the valve may also include a cap or stop.

A plastic insert can be sewn or otherwise connected onto the top 12 allowing the user to roll the material down, creating a water-tight seal. An additional piece of material 13 which can be sewn or connected onto the top 12 opposite of the plastic insert to add rigidity to the bag when rolling the material down onto itself. The bag 10 can include a male buckle component 15 and a female buckle component 17 used to hold the items stored therein in place and once secured and connected, ensures its waterproof nature.

The bag 10 can be sewn or otherwise formed in a suitable shape, such as a semi cylindrical-like shape. The top 12 of the sack is open, flat and can have plastic insert roll-hemmed onto the fabric on one side and an additional piece of material sewn onto the opposite end to add rigidity. The bottom 24 of the bag 10 utilizes a fluid connection component which can be recessed or connected and have a flange that is either sewn, or welded onto the material creating a watertight seal.

An exemplary method of manufacturing the bag 10 is as follows: A sheet of food-grade waterproof material is cut to the desired size. The material is placed flat and sewn together using waterproof seam tape or welded together. The top 12 is straight and can include a rolled seam to form a channel with plastic inserted into the channel to add rigidity. On one side of top 12, a piece of reinforcing material can be sewn across the top 12 to reinforce the same and asset in rolling down top 12 and include ends for connecting a male buckle and female buckle to be placed on either end. The bottom 24 can be sewn into place in the form of a circle. Waterproof seam tape or a welding process is here again used to bond the material. A hole (which can be circular shape) can be cut into the bottom 24 and valve connection component 26 (which can be include a quick connect is welded sealably into place). This allows the bag 10 to be used to carry water and drain it or filter when desired.

The water potable waterproof material, waterproof seam tape or welding techniques, and the sealable valve connection component aid to provide utility of the invention. The buckles are optional, hook and pile tape could possibly be used but would not offer the same level of water protection. The bag 10 of the invention can also provide storage for other items such as a nylon hammock, sleeping bag, down jacket, electronics (or similar device) and keep the contents dry while also affording the user the ability to collect/drain/filter water or utilize the bag 10 as a billow type device. This saves the user weight and space in their back pack or vessel (kayak for example) as well as prevents additional items from having to be purchased. The invention negates the need of the user from carrying additional equipment into the field, thereby reducing weight, space, and cost.

What is claimed is:

1. A multipurpose bag, which includes:
   a bag made of non-breathable water proof material which is water potable safe for human consumption, said bag including a top having an opening of a size to receive at least one complementary accessory therein, a side wall having a first end connected to said top having a length to accommodate said accessory therein, a bottom connected to a second end of said side wall;
   a first valve connection component sealably connected to said bag to permit fluid communication upon actuation thereof;
   a second valve connection component for connection to said first valve connection component and having a first end of a conduit connected thereto;
   a third valve connection component connected to a second end of said conduit;
   wherein said at least one complementary accessory includes a first complementary accessory including a water filter device removably disposed within said bag having fourth valve connection component for connection to said third valve connection component upon removal from said bag and a second complementary accessory including an inflatable mattress removably disposed within said bag having fifth valve connection component for connection to said third valve connection component upon removal from said bag.

2. The multipurpose bag of claim 1, wherein said at least one complementary accessory includes a shower head removably disposed in said bag having sixth valve connection component for connection to said third valve connection component upon removal from said bag.

3. The multipurpose bag of claim 1, wherein said bag is a dry bag made of water potable thermoplastic polyurethane.

* * * * *